(12) United States Patent
Egner et al.

(10) Patent No.: US 8,645,251 B2
(45) Date of Patent: Feb. 4, 2014

(54) SYSTEM AND METHOD FOR ANALYZING STRATEGIC NETWORK INVESTMENTS IN WIRELESS NETWORKS

(71) Applicant: Cerion Optimization Services, Inc., Frisco, TX (US)

(72) Inventors: Will A. Egner, Cedar Park, TX (US); Vinay Mallapu, Irving, TX (US); Wei Yuan, Plano, TX (US)

(73) Assignee: Cerion Optimization Services, Inc., Frisco, TX (US)

( * ) Notice: Subject to any disclaimer, the term of this patent is extended or adjusted under 35 U.S.C. 154(b) by 0 days.

(21) Appl. No.: 13/856,239

(22) Filed: Apr. 3, 2013

(65) Prior Publication Data

US 2013/0226673 A1  Aug. 29, 2013

Related U.S. Application Data

(62) Division of application No. 10/585,011, filed as application No. PCT/US2005/000217 on Jan. 6, 2005, now abandoned.

(60) Provisional application No. 60/534,658, filed on Jan. 6, 2004.

(51) Int. Cl.
*G06Q 40/00* (2012.01)
*G06Q 10/00* (2012.01)
*G06F 17/00* (2006.01)

(52) U.S. Cl.
USPC .............................. 705/35; 705/7.12; 705/400

(58) Field of Classification Search
CPC ............................... G06Q 40/00; G06Q 50/30
USPC ..................................... 705/35–40, 7.12, 400
See application file for complete search history.

(56) References Cited

U.S. PATENT DOCUMENTS

| 5,787,344 A | 7/1998 | Scheinert |
|---|---|---|
| 5,937,042 A | 8/1999 | Sofman |

(Continued)

FOREIGN PATENT DOCUMENTS

| WO | WO 2006/052269 A2 | 5/2006 |
|---|---|---|
| WO | WO 2007133234 A2 * | 11/2007 |

OTHER PUBLICATIONS

"Extended European Search Report," Application No. 06800893.7, Applicant: Cerion Optimization Services, Inc., Jun. 6, 2013, 8 pages.

(Continued)

*Primary Examiner* — Eric T Wong
*Assistant Examiner* — Edward Baird
(74) *Attorney, Agent, or Firm* — Slater & Matsil, L.L.P.

(57) ABSTRACT

A method and a system to assist wireless telecom service providers to make strategic investment decisions in their wireless networks is provided. Geographical profitability information in a wireless network is determined to decide where to invest capital funds in order to increase the revenue and profit for wireless service providers. The profitability of a geographical area or a sector is calculated based on network Operation Measurements and subscriber CDR (Call Detail Record) data. The system prioritizes the geographical areas and sectors for capital investments based on the profitability of the areas and sites. Similar information may be determined to assist wireless service providers in developing a decommissioning strategy. Embodiments of the present invention may also be used to reduce network churn by understanding where dissatisfied subscribers experience poor service and where network investments need to be made to improve the services and reduce churn.

20 Claims, 11 Drawing Sheets (56) References Cited

U.S. PATENT DOCUMENTS

| | | | |
|---|---|---|---|
| 5,940,373 | A | 8/1999 | Chiu et al. |
| 6,055,433 | A | 4/2000 | Yuan et al. |
| 6,070,090 | A | 5/2000 | Feuerstein |
| 6,208,866 | B1 | 3/2001 | Rouhollahzadeh et al. |
| 6,438,357 | B1 | 8/2002 | Oh et al. |
| 6,463,287 | B1 | 10/2002 | Wegner |
| 6,539,221 | B1 | 3/2003 | Vasudevan et al. |
| 6,618,355 | B1 | 9/2003 | Gulliford et al. |
| 6,952,705 | B2 * | 10/2005 | Knoblock et al. ............... 1/1 |
| 7,020,087 | B2 | 3/2006 | Steinberg et al. |
| 7,103,610 | B2 * | 9/2006 | Johnson et al. ................ 1/1 |
| 7,107,224 | B1 | 9/2006 | Weller et al. |
| 7,127,460 | B2 * | 10/2006 | Nixon et al. ................... 1/1 |
| 7,143,100 | B2 * | 11/2006 | Carlson et al. ................. 1/1 |
| 7,158,790 | B1 | 1/2007 | Elliott |
| 7,218,928 | B2 | 5/2007 | Park et al. |
| 7,343,334 | B1 | 3/2008 | Adduci et al. |
| 8,320,920 | B1 * | 11/2012 | Tran ............................ 455/446 |
| 2002/0069102 | A1 | 6/2002 | Vellante et al. |
| 2002/0173313 | A1 * | 11/2002 | Hutcheson et al. ........ 455/453 |
| 2003/0004925 | A1 * | 1/2003 | Knoblock et al. ............. 707/1 |
| 2003/0083073 | A1 | 5/2003 | Cossins et al. |
| 2003/0083912 | A1 | 5/2003 | Covington, III et al. |
| 2003/0093310 | A1 | 5/2003 | Macrae |
| 2003/0158765 | A1 | 8/2003 | Ngi et al. |
| 2004/0015452 | A1 * | 1/2004 | Hertz et al. .................. 705/400 |
| 2004/0034577 | A1 | 2/2004 | Van Hoose et al. |
| 2004/0214577 | A1 | 10/2004 | Borst et al. |
| 2005/0097161 | A1 | 5/2005 | Chiou et al. |
| 2005/0132027 | A1 | 6/2005 | Vicente et al. |
| 2005/0177629 | A1 | 8/2005 | Betge-Brezetz et al. |
| 2005/0202811 | A1 | 9/2005 | Abed et al. |
| 2006/0077900 | A1 | 4/2006 | Carello et al. |
| 2006/0262730 | A1 | 11/2006 | Fournigault et al. |
| 2007/0158765 | A1 | 7/2007 | Ahn et al. |
| 2008/0109731 | A1 | 5/2008 | Chang et al. |
| 2009/0106064 | A1 * | 4/2009 | Egner et al. ..................... 705/7 |
| 2009/0274067 | A1 | 11/2009 | Zolfaghari |
| 2013/0225156 | A1 * | 8/2013 | Yuan et al. ................ 455/422.1 |

OTHER PUBLICATIONS

Apostolopoulos, T.K., et al., "Information Technology Investment Evaluation: Investments in Telecommunication Infrastructure," International Journal of Information Management, vol. 17, No. 4, pp. 287-296, 1997.

Supplementary European Search Report received in European Application No. 07754697.6, Applicant: Cerion Optimization Services, Inc., Jun. 5, 2012, 7 pages.

Gavish, B., et al., "Economic Aspects of Configuring Cellular Networks," Wireless Networks, Feb. 1, 1995, vol. 1, No. 1, pp. 115-128.

Kalvenes, J., et al., "Hierarchical cellular network design with channel allocation," European Journal of Operational Research, Jan. 1, 2005, vol. 160, No. 1, 20 pages.

"Supplemental European Search Report," Application No. 05705029.6, Applicant: Cerion Optimization Services, Inc., Dec. 4, 2013, 3 pages.

Tutschku, K., "Demand-based Radio Network Planning of Cellular Mobile Communication Systems," Seventeenth Annual Joint Conference of the IEEE Computer and Communications Society, Mar. 29, 1998, vol. 3, pp. 1054-1060.

* cited by examiner

Formatted VendorlGsm Record
---

|     |     |     |
| --- | --- | --- |
| | RecordDescriptor | ( 8) : [01780000] |
| | HexadecimalId | ( 2) : [aa] |
| 501 | MscStructureCode | ( 6) : [10003] (Mobile Terminated Call |
| | CallTypeCode | ( 4) : [002] (Mobile Terminated) |
| | StudyIndicator | ( 2) : [0] (Normal Record) |
| | CallForwardIndicator | ( 2) : [1] |
| | CalledParty | (30) : [1--210888888822076] |
| 502 | CallingNumber | (30) : [0-01201-2108888888] |
| | CalledNumber | (40) : [2-01101-12104899999] |
| | CalledEquipment | (22) : [350314000942630] |
| | AdditionalInfo | ( 4) : [] |
| | ChannelAllocationTime | (16) : [031111:15:52:14.700] |
| 503 | AnswerTime | (16) : [031111:15:52:35.600] |
| | DisconnectTime | (16) : [031111:15:52:48.300] |
| | ReleaseTime | (16) : [031111:15:52:48.500] |
| | OffAirCallSetup | ( 2) : [0] |
| 504 | HalfRateInuse | ( 2) : [0] |
| | CauseForTermination | ( 4) : [000] (Normal Release) |
| | CallReference | ( 8) : [0250762] |
| | MsClassMark | ( 8) : [2100100] |
| | ClassMarkTimeStamp | (16) : [031111155212500] |
| | IncomingTrunkGroup | ( 6) : [00211] |
| | IncomingTrunkMember | ( 6) : [00071] |
| | IncomingRouteGroup | ( 4) : [] |
| | TrunkSeizureTimeIncoming | (16) : [031111155210100] |
| | CallingSuscriberCategory | ( 4) : [010] (Ordinary) |
| 505 | CallIndicator | ( 8) : [0000000] (No Indication) |
| | CallDuration | ( 8) : [0000013] |
| | Diagnostic | ( 6) : [04016] |
| | MscNumber | (28) : [01101-19078319014] |
| | RecordNumber | (12) : [00294173267] |

* Appended module *

|     |     |     |
| --- | --- | --- |
| | MscModuleCode03 | ( 4) : [003] |
| | RoamingNumberAp03 | (30) : [3-01101-16264281054] |
| | MscNumberAp03 | (28) : [01101-19078319014] |
| | IncomingTrunkGroupAp03 | ( 6) : [00552] |
| | IncomingTrunkMemberAp03 | ( 6) : [00010] |
| 506 | LocationAreaAp03 | (12) : [31038005030] |
| | CellIdentityAp03 | ( 6) : [04761] |
| | ChannelType | ( 6) : [11120] |

SYSTEM AND METHOD FOR ANALYZING STRATEGIC NETWORK INVESTMENTS IN WIRELESS NETWORKS

This application is a divisional of patent application Ser. No. 10/585,011, entitled "System and Method for Analyzing Strategic Network Investments in Wireless Networks," filed on Jun. 29, 2006, which is a national phase filing under section 371 of International Application No. PCT/US2005/000217, entitled "System and Method for Analyzing Strategic Network Investments in Wireless Networks," filed Jan. 6, 2005, which claims priority to U.S. Provisional Application No. 60/534,658, filed on Jan. 6, 2004, entitled "Systems and Methods for Making Strategic Capital Investments for Wireless Network," which applications are incorporated herein by reference.

CROSS-REFERENCE TO RELATED APPLICATIONS

This application is related to the following commonly assigned U.S. patent application Ser. No. 12/443,956, filed Apr. 1, 2009, entitled "System and Method for Re-home Sequencing Optimization," which application is hereby incorporated herein by reference.

TECHNICAL FIELD

The present invention relates generally to wireless networks and, more particularly, to systems and methods for analyzing strategic network investments in wireless networks.

BACKGROUND

The wireless telecommunications industry has been experiencing a tremendous growth in the past few years and, as a result, is often characterized by fierce competition between wireless service providers. In an attempt to increase revenues and profits, it is generally important for the service providers to provide better services with lower costs. Because RF (Radio-Frequency) equipment (e.g., transmission equipment, wireless network equipment) and operation cost is one of their largest network investments, it is generally important for wireless service providers to ensure that those investments increase returns in terms of revenue and profit.

Figure 1:
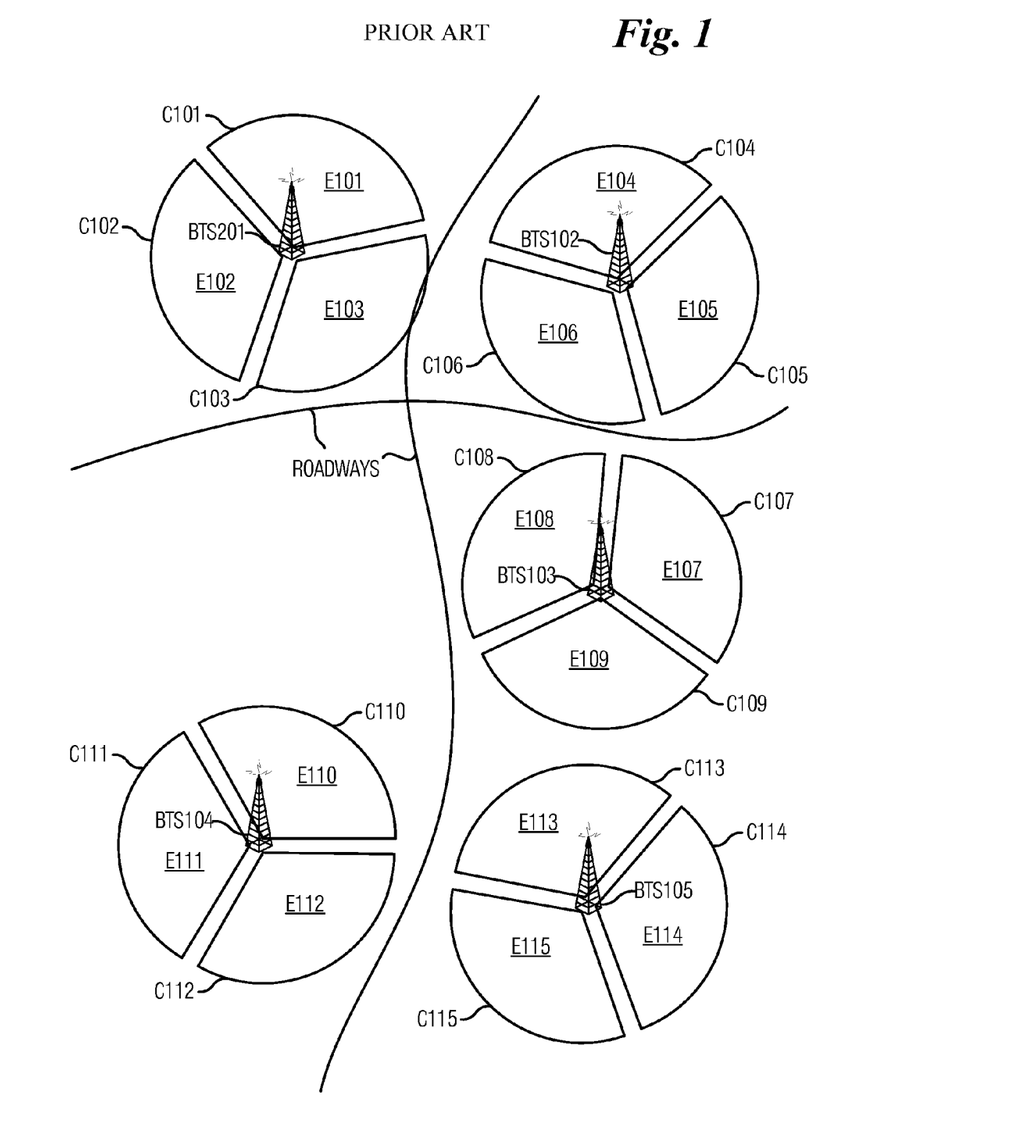
FIG. 1 is a network diagram of a wireless cellular network.

FIG. 1 illustrates a typical wireless telecommunication access (RF) network wherein base transceiver stations ("BTS"), such as BTS 101-BTS 105, are deployed at certain locations. A BTS (also called a cell site) contains equipment such as a radio tower, antennas, radios, and cables for supporting the traffic in its coverage area. A BTS coverage area is typically divided into sectors, such as sectors C101-C115, in which transceiver antennas face to a certain orientation for covering an area within an angle. In typical installations, each sector C101-C115 covers an area within a 120° angle.

As their subscriber base grows, wireless service providers need to identify where in the network to invest in order to provide satisfactory services to subscribers. For example, service providers need to identify BTSs and/or sectors of BTSs that require more equipment to support the current or projected traffic in each area or, in another example, need to identify where an additional BTS should be located for sufficient traffic coverage.

Current planning systems and methods attempt to create network plans that minimize the overall cost while maintaining coverage of a certain percentage of total traffic (Erlangs) in the network. These systems and methods, however, fail to account for the different level of revenue contributions from different groups of subscribers. As a result, current planning systems and methods may generate network plans that suggest investment in areas that will not generate the most revenue or profit for the wireless service provider. In fact, the current planning systems methods may indicate an investment in a location that will not generate any additional revenue, creating an investment and operational loss for the service provider.

For example, reference numerals E101-115 indicate the uncovered Erlangs for sectors C101-115, respectively. In current planning systems, the sectors are prioritized based on the uncovered traffic in each sector (E101-E115) and the investment (e.g., radios) in a sector depends on the priority of that sector. Additional BTSs may be deployed first at the locations where uncovered Erlangs are the highest, regardless of the amount of revenue (or loss) the investment is expected to return.

SUMMARY OF THE INVENTION

These and other problems are generally reduced, solved or circumvented, and technical advantages are generally achieved, by embodiments of the present invention, which provides systems and methods for analyzing strategic capital investments in wireless networks.

Embodiments of the present invention provide a measurement-based system and method to assist wireless service providers in analyzing strategic capital investment decisions in their networks in order to increase revenue and profitability. Embodiments prioritize the geographical areas and BTSs for capital investments based on the profitability of the areas and sites. The profitability of a geographical area or a cell site may be calculated based on network Operation Measurements and subscriber CDR (Call Detail Record) data. The system and method can be used by service providers to reduce network churn by understanding where dissatisfied subscribers experience poor service and where network investments need to be made to improve the services and reduce churn.

It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The object and other advantages of this invention are best described in the preferred embodiment with reference to the attached drawings that include:

FIG. 5 is an illustration of the fields of interest in a CDR (Call Detail Record) sample in accordance with an embodiment of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One skilled in the art will appreciate that embodiments of the present invention may be used by wireless service providers to increase gross profit margins as opposed to the typical method of maximizing traffic coverage using Erlangs. Embodiments of the present invention prioritize geographical areas and BTSs for network investments based on the profit loss of the areas and sites. Network investments may be based upon, for example, call detail records and operation measurements.

Embodiments of the present invention may also be utilized to reduce subscriber churn rates. For example, when targeting subscribers at the end of their contracts, the system and method described herein may reduce churn by providing a list of investment areas where targeted subscriber service experiences need the most improvement.

Figure 2:
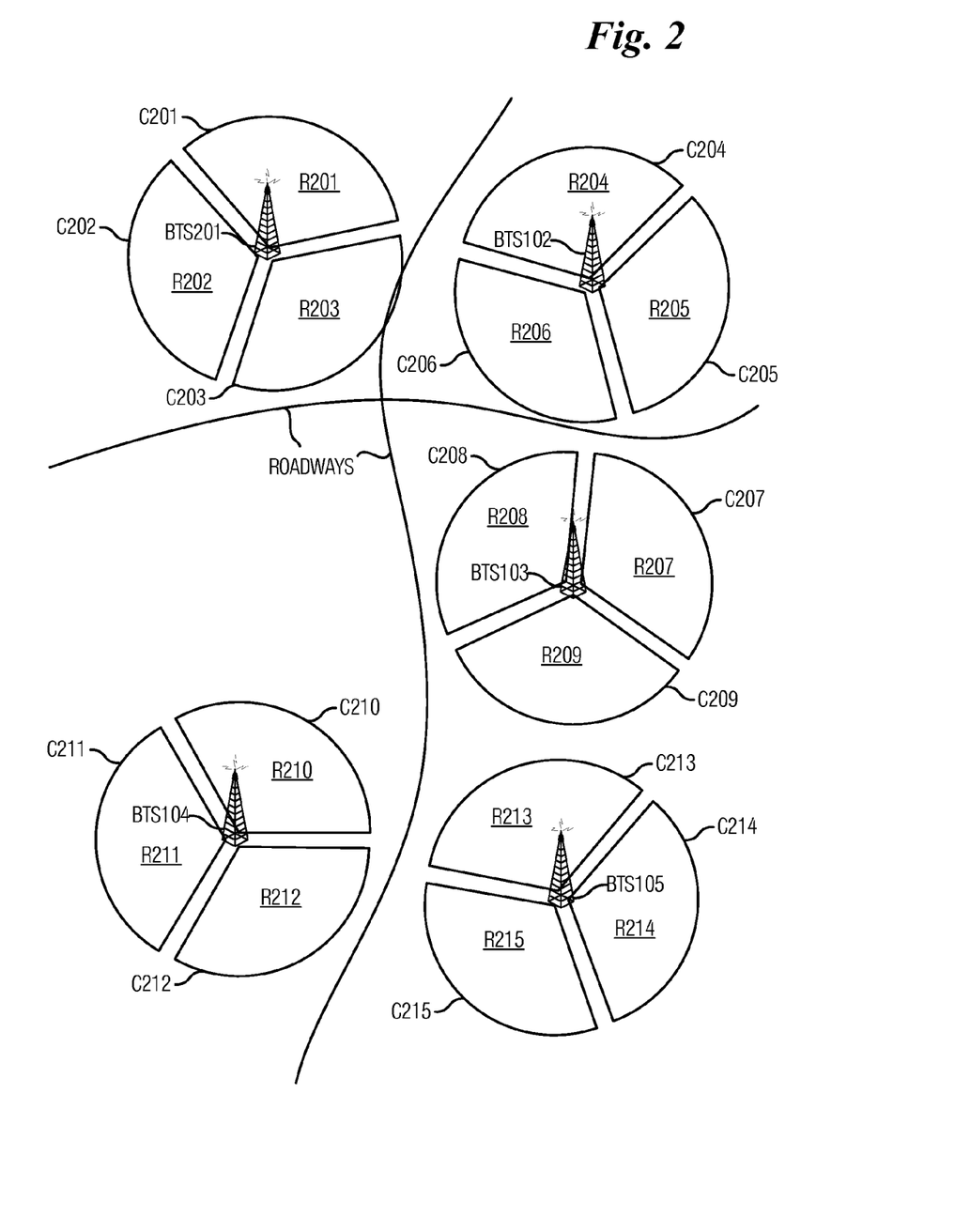
FIG. 2 is a network diagram illustrating an embodiment of the present invention.

FIG. 2 is a network diagram illustrating a system and method of analyzing strategic network investments in wireless networking in accordance with an embodiment of the present invention. Generally, investment return in terms of dollars is calculated for each sector based upon, among other things, the profit loss due to uncovered traffic and investment (e.g., radios) cost to recover the uncovered traffic. In FIG. 2, R201-R215 represent the investment return in terms of dollars due to uncovered traffic for sectors C201-C215, respectively. As will be described in greater detail below, after the investment return is determined for each sector, the sectors may be prioritized based on investment returns that the service provider may expect from an investment in each sector. In this manner, the service provider is able to make the investment decision in a sector based upon the amount of investment return expected, thereby increasing the returns on investment dollars and profit.

Figure 3:
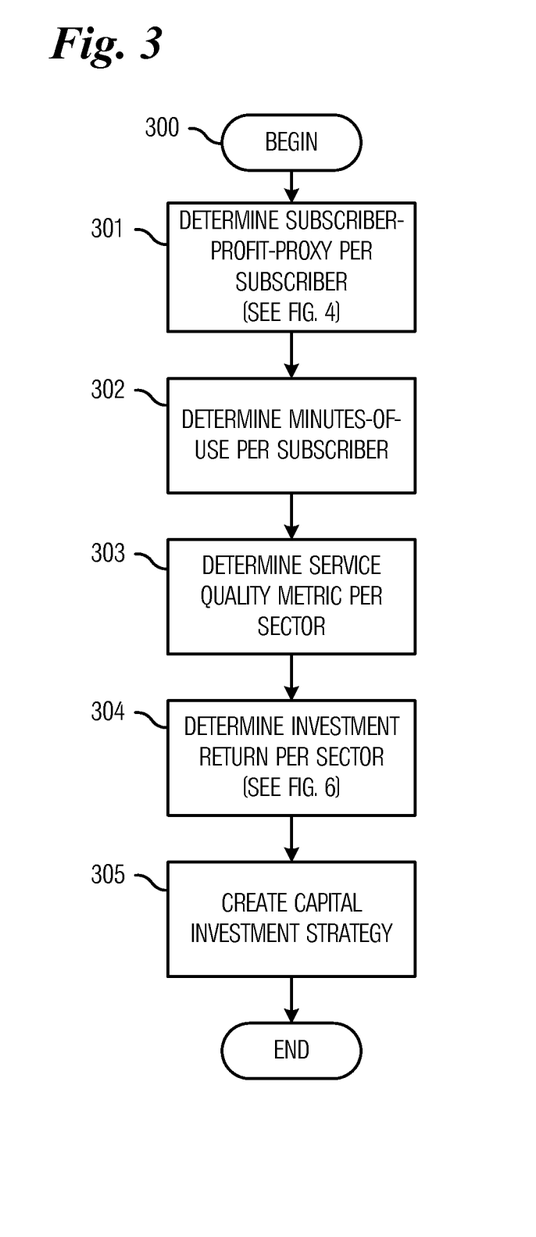
FIG. 3 is a flow chart illustrating a method of analyzing strategic network investments in wireless networks in accordance with an embodiment of the present invention.

FIG. 3 is a flow chart of a method of investment decisions based upon expected investment returns in wireless access networks in accordance with an embodiment of the present invention. The method begins in step 301, wherein Subscriber Profit Proxy (SPP) is created for one or more subscribers in the network. Generally, the SPP value quantifies the amount of profit (gross earnings) the service provider expects to receive from a given subscriber over a specified period of time. A method of determining the SPP value of one or more subscribers is discussed in greater detail below with reference to FIG. 4.

It should be noted that the subscribers selected for analysis may be a particular group, all of the subscribers in a network, or the like. For example, to determine an investment strategy for data services, the group of subscribers may consist of those subscribers currently using the data services being analyzed. Another example includes specifying a group of subscribers whose subscription contracts will end shortly (e.g., in a month, next quarter, or the like) in order to reduce churn by investing in networks to improve the service quality for that group of subscribers.

In step 302, the Minutes-of-Use (MOU) is determined for each subscriber. The MOU may be determined, for example, from Call Detail Records (CDRs). In a preferred embodiment, the MOU for each subscriber is determined for the peak usage hours. In this manner, only the "revenue generating" periods are taken into account for the investment decision. For example, many service providers provide free service during nights and weekends. Use during this time, therefore, is not considered as generating revenue, and when determining where an investment should be made to increase revenue and profit, should not be considered.

It should be noted that peak usage hours are typically defined by wireless service providers and may vary between regions, demographics, and plan details. Additionally, the duration of the peak usage period may also vary. For example, the peak usage period over which MOU may be determined may be a month, a week, or a weekday of peak usage hours, and may be dependent upon, among other things, the computational power of the computational system. A longer peak usage period provides more precise results, but may require more computational power.

Next, in step 303, a service quality metric for each sector in the network is determined. In a preferred embodiment, step 303 collects the service quality metric, such as a drop-call rate, for each sector in the network. Drop-call rate $D_k$ at sector k may be calculated by aggregating all calls terminated abnormally in each sector as determined by the call termination cause field 504 (discussed below with reference to FIG. 5) in the CDRs. The drop-call rate at each sector may also be collected from the Operational Measurements (OMs) at the BTSs and/or BSCs (Base Station Controllers).

In step 304, investment returns for each sector based at least in part on the SPP values, MOU, and service quality metric data are calculated. A method that may be used to determine the investment return for each sector is described in greater detail below with reference to FIG. 6.

In step 305, a capital investment strategy is created by prioritizing the sectors in the network. Sectors with higher Sector Investment Returns should be given higher priorities to invest. Other factors, however, may also factor into the investment decision.

Figure 4:
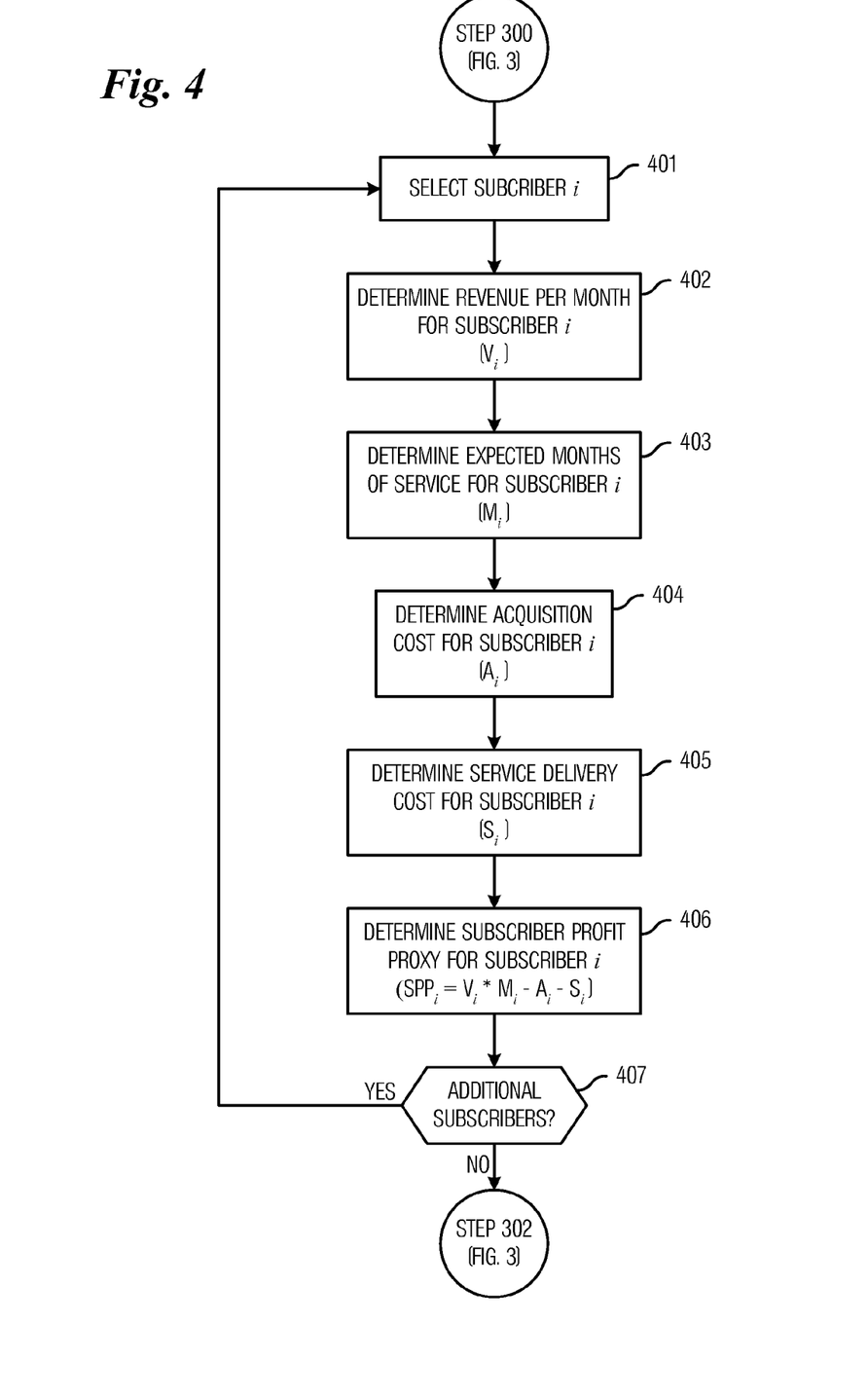
FIG. 4 is a flow chart illustrating a method of computing the Subscriber Profit Proxy (SPP) for subscribers in wireless networks in accordance with an embodiment of the present invention.

FIG. 4 is a flow chart illustrating a method of the SPP for one or more subscribers discussed above with reference to step 301 of FIG. 3 in accordance with an embodiment of the present invention. It should be noted that in a preferred embodiment, the SPP calculations are calculated as long-term profit values. Other time periods (shorter or longer) may be used. The equations given herein are provided as examples and, accordingly, may be altered to customize the equations for a given scenario.

The process begins in step 401, wherein a subscriber i is selected. In step 402, the revenue generated by the subscriber i per month is calculated from the service provider's database. Thereafter, the expected number of months that the subscriber would stay under the current contract is determined in step 403, the acquisition cost (e.g., marketing cost, discount on mobile terminals, etc.) to the service provider for signing the subscriber is determined in step 404, and the cost of delivering services to the subscriber is determined in step 405. The expected number of months that a subscriber would stay under a particular contract is usually the same for a category of subscribers under the same contract and may be calculated based on the number of months of stay for all previous and existing subscribers.

The SPP of subscriber i may be calculated using the formula presented in step 406.

$$SPP_i = V_i * M_i - A_i - S_i$$

wherein
$V_i$ is the revenue per month for subscriber i;
$M_i$ is the expected months under contract for subscriber i;
$A_i$ is the acquisition cost for subscriber i; and
$S_i$ is the service delivery cost for subscriber i.

After computing the SPP value for subscriber i, processing returns to step 401 to compute the SPP value for the next subscriber in the network. This process may be repeated until a SPP value has been determined for all subscribers in the network.

FIG. 5 illustrates fields of a Call Detail Record (CDR) that may be used in an embodiment of the present invention. In particular, FIG. 5 illustrates fields of a CDR that may be collected in step 302 of FIG. 3 to determine peak usage periods. Field 501 in FIG. 5 indicates the call type which is, in this example, a "Mobile Terminated" call (i.e., a call terminating at a mobile unit). Fields 502 provide identities of subscribers (calling and called parties). Fields 503 show the start and end time of the call. Field 504 illustrates the call termination cause, which is "Normal Release" in the illustrated example. Any abnormal release in this field typically indicates a dropped call. Field 505 gives the call duration in seconds. Field 506 provides the sector ID where the call takes place. If a subscriber travels among multiple sectors during a call, the IDs of all sectors where the subscriber travels and the duration of the call in each sector will be recorded in the CDR.

Figure 6:
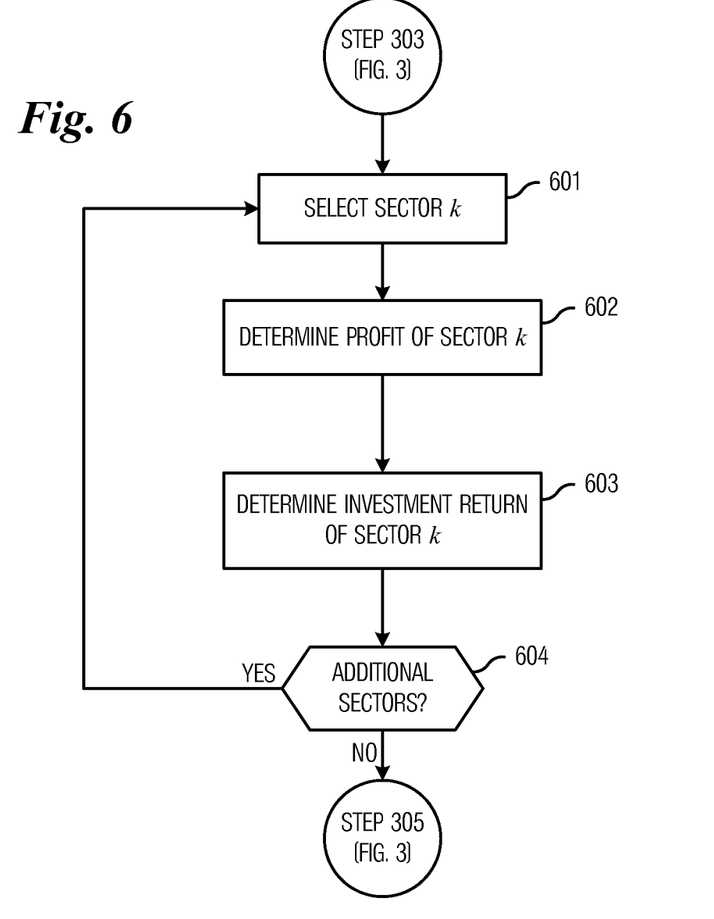
FIG. 6 is a flow chart for a method of calculating the Investment Return Value for all sectors in wireless networks in accordance with an embodiment of the present invention.

FIG. 6 is a data flow diagram that may be used to determine the investment return per sector as described above in step 304 of FIG. 3 in accordance with an embodiment of the present invention. In particular, after performing step 303 in FIG. 3, processing may proceed to step 601 of FIG. 6, and after completing the processing described in FIG. 6, processing may return to step 305 of FIG. 3.

The process begins in step 601, wherein a sector is selected. In step 602, the Sector Profit $P_k$ is calculated for the selected sector. The Sector Profit $P_k$ may be calculated based upon the Minutes-Of-Use (MOUs) for all subscribers in each sector, which may be determined by aggregating all of the call minutes for all subscribers within the selected sector as may be determined from fields 505 ("Call Duration") and 506 ("CellIdentity") of the CDR illustrated in FIG. 5. Sector Profit $P_k$ may be computed using the following formula, which is based on the MOU and SPP of the subscriber.

$$P_k = \sum_i \left[ SPP_i * \frac{MOU_{ik}}{\sum_j MOU_{ij}} \right]$$

wherein
k represents a sector;
i represents a subscriber;
j represents a sector;
$P_k$ is the profit for sector k;
$SPP_i$ is the SPP value for subscriber i;
$MOU_{ik}$ is the minutes of use for subscriber i in sector k;
$MOU_{ij}$ is the minutes of use for subscriber i in sector j; and $$\sum_j MOU_{ij}$$

is the sum of the minutes of use for subscriber i in all sectors

Thereafter, a Sector Investment Return $R_k$ may be calculated in step 603 based on Sector Profit Loss, which is equal to $P_k \times D_k$ ($P_k$ is Sector Profit and $D_k$ is drop-call rate) less the investment needed to recover the drop calls at the sector. The equation for calculating the Sector Investment Return $R_k$ may be expressed as follows.

$$R_k = P_k + D_k - I_k$$

wherein
k represents a sector;
$P_k$ is the profit for sector k;
$D_k$ is the drop-call rate for sector k; and
$I_k$ is the investment needed to recover the drop calls in sector k.

After calculating the Sector Investment Return of sector k in step 603, the process proceeds to step 604 to determine if additional sectors need to be processed. The process returns to step 601 to determine the Sector Investment Return for the next sector.

Figure 7:
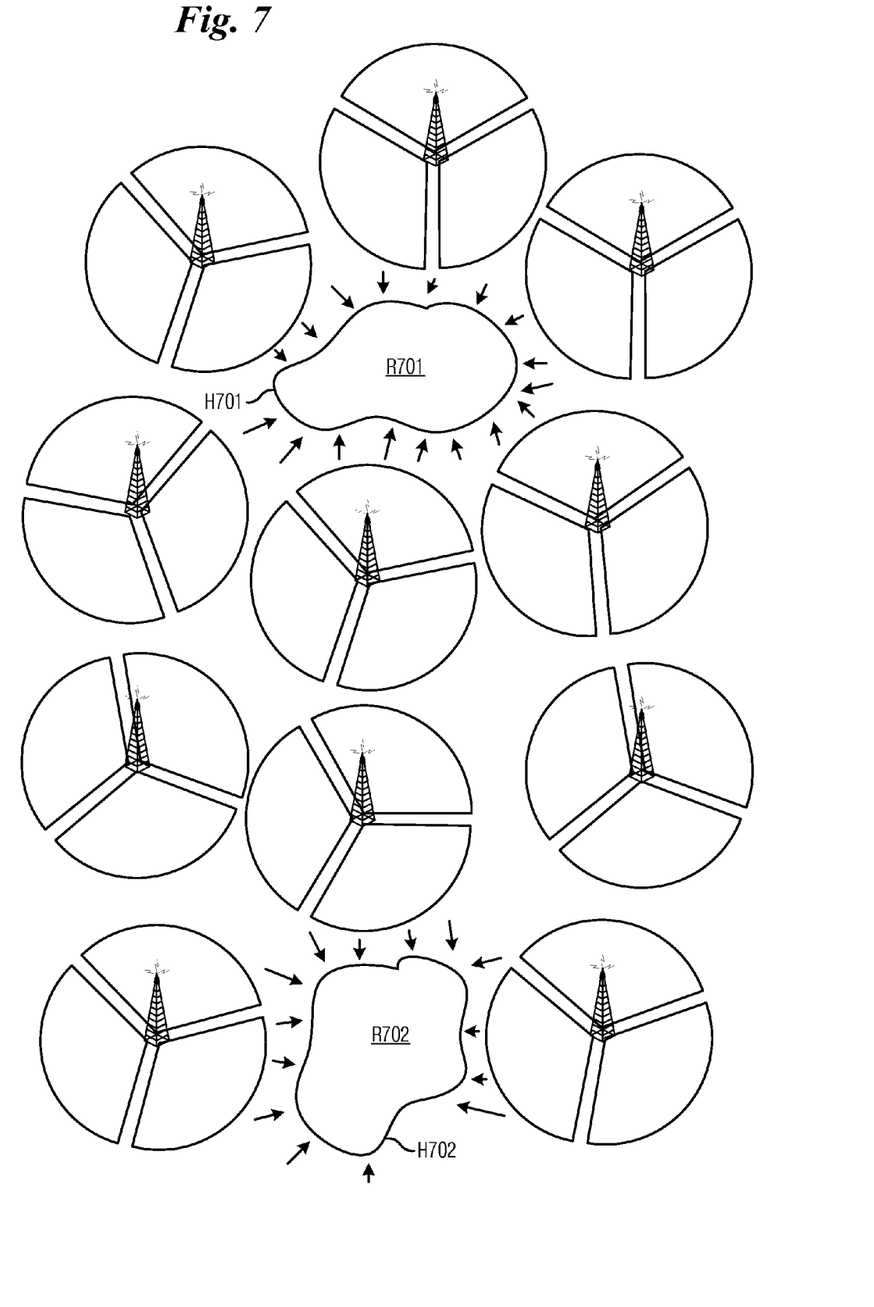
FIG. 7 is a network diagram illustrating a method of analyzing network investments for additional BTSs in wireless networks in accordance with an embodiment of the present invention.

FIG. 7 is a network diagram illustrating the concept of determining where additional BTS investments may be made in uncovered areas to increase return on investment in accordance with an embodiment of the present invention. Uncovered areas (referred to as "Coverage Holes") H701 and H702 represent areas in which the current network topology fails to sufficiently cover. As a result, the coverage holes represent lost revenue for wireless service providers who constantly deploy new BTSs to fill the "coverage holes" in order to recover the revenue loss and improve subscriber satisfactions. The following paragraphs disclose a system and method for evaluating the coverage holes to determine new BTS locations to increase revenue and profit. Generally, the teachings of the present invention determine investment returns (e.g., investment returns R701 and R702 for coverage holes H701 and H702, respectively) and prioritize the investment returns to determine the profitable locations for a new BTS.

Figure 8:
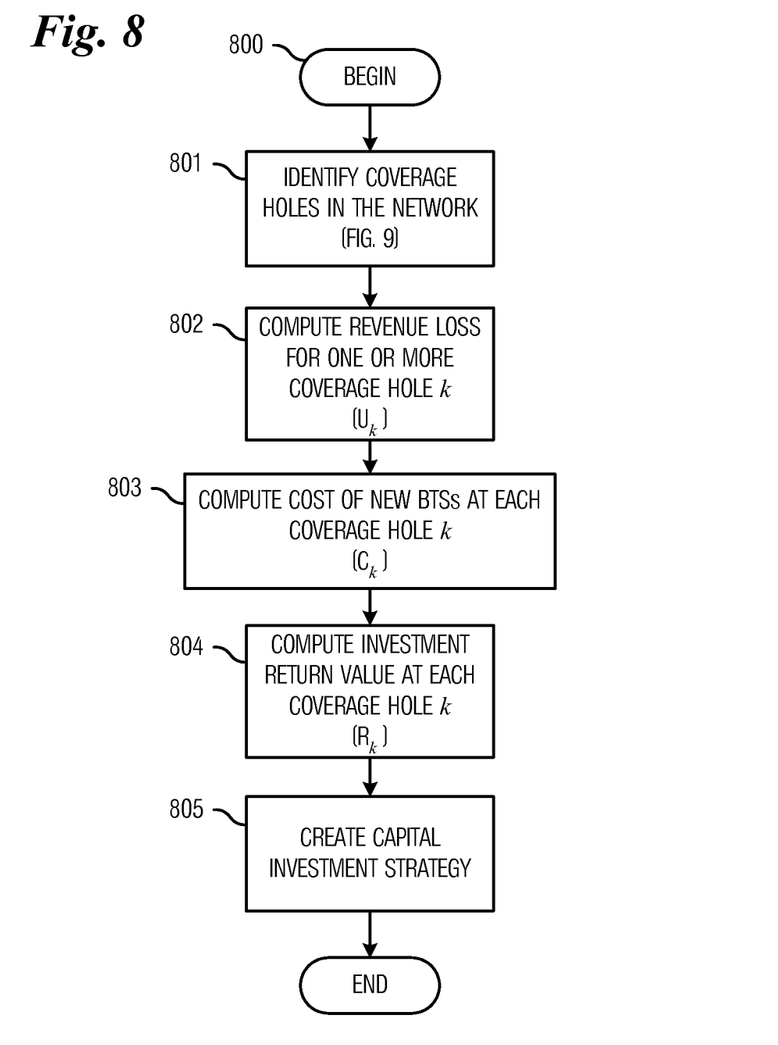
FIG. 8 is a flow chart illustrating a method of analyzing capital investments for additional BTSs in wireless networks in accordance with an embodiment of the present invention.

FIG. 8 is a data flow chart for identifying additional BTS locations for network investment in accordance with an embodiment of the present invention. The process begins in step 801, wherein the "coverage holes" in the network are identified using sector orientations, time-advance data, mobile location data, dropped-call data from CDRs, and drive-test data (FIG. 9 will describe coverage hole identification in greater detail). At step 802, the revenue loss $U_k$ at coverage hole k is determined using, for example, the revenue data and CDR at the BTS for all BTS in the network. The following equation may be used to determine the revenue loss $U_k$.

$$U_k = \sum_i [D_{ik} * AMOU_i * UPM_i]$$

wherein
k represents a coverage hole;
i represents a subscriber;
$D_{ik}$ is the number of monthly dropped calls by subscriber i at coverage hole k;
$AMOU_i$ is the average MOU per call of subscriber i;
$UPM_i$ is the revenue generated per minute by subscriber i; and
$U_k$ is the revenue loss at coverage hole k.

$D_{ik}$, $AMOU_i$ and $UPM_i$ can be obtained from CDR data. In step 803, the cost for adding new BTSs to cover coverage-hole k is determined. The cost for BTSs to cover coverage-hole k ($C_k$) may include, for example, monthly equipment cost $E_k$, site monthly leasing cost $L_k$, and monthly transport leasing cost $T_k$. Other monthly costs $O_k$, such as electricity, may also be included in $C_k$. The BTS costs preferably include costs for multiple BTSs, if multiple BTSs are required.

In step 804, the BTS investment return value $R_k$ is determined for each coverage hole. In a preferred embodiment, the investment return value $R_k$ is determined by the revenue loss due to coverage-hole k ($U_k$) less the cost of the additional BTS required to cover the coverage hole ($C_k$). Thereafter, in step 805, a BTS investment strategy may be determined at least in part by prioritizing the BTSs based on their investment return values $R_k$ for the BTSs.

Figure 9:
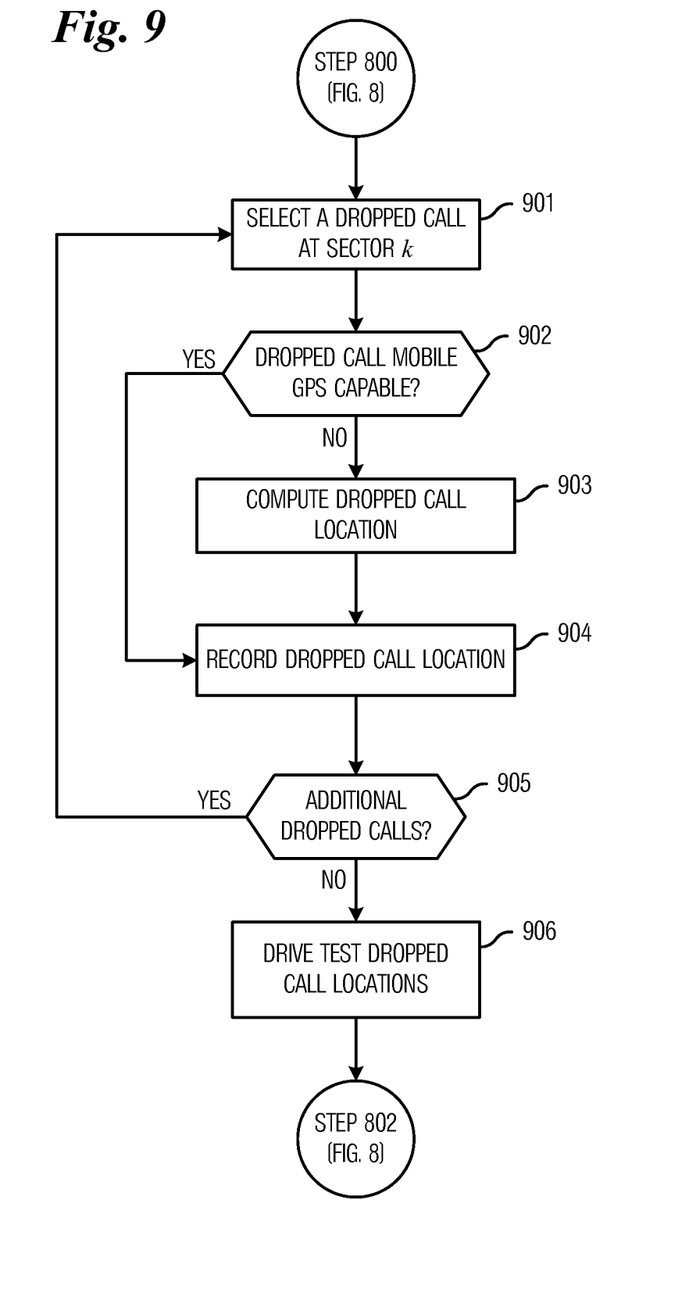
FIG. 9 is a flow chart illustrating a method for identifying coverage holes in a wireless network in accordance with an embodiment of the present invention.

FIG. 9 is a flow diagram that shows a method for identifying the coverage holes in the network as described above in step 801 of FIG. 8 in accordance with an embodiment of the present invention. In particular, after initiating the process at step 800 in FIG. 8, processing may proceed to step 901 of FIG. 9, and after completing the processing described in FIG. 9, processing may return to step 802 of FIG. 8.

In step 901, a dropped call l is selected and the sector k is determined where the dropped call was recorded based on CDR data. In step 902, a determination is made whether or not the dropped call mobile is GPS (Global Position System) capable. If a determination is made that the dropped call mobile is GPS capable, then processing proceeds to step 904, wherein the location record of the dropped call can be found from the subscriber's CDR data. Otherwise, processing proceeds to step 903, wherein the dropped call location $DCL_l$ is determined. The dropped call location $DCL_l$ may be determined using the following formula.

$$\overrightarrow{DCL_l} = \overrightarrow{SL_k} + TA_l * \begin{pmatrix} \cos(\alpha_k) \\ \sin(\alpha_k) \end{pmatrix}$$

wherein
l represents a dropped call;
k represents a sector;
$SL_k$ is the location of the sector k;
$\alpha_k$ is the orientation of the sector k; and
$TA_l$ is the time advance of the dropped call mobile, which indicates the distance between the dropped call mobile and the sector k.

Next, in step 904, the location of the dropped call l is recorded. In step 905, a determination is made whether or not additional dropped calls have occurred whose location has not been determined. If such a dropped call exists, processing returns to step 901 to determine the location of the next dropped call. Otherwise, processing proceeds to step 906, wherein a drive test is preferably performed to identify the coverage holes in the network using the dropped call locations. At a particular dropped call location, there may be multiple dropped calls that occurred. The dropped call locations may be prioritized for drive test based upon the number of dropped calls at each location. Generally, a drive test involves RF engineers driving through the identified locations to measure the RF signal strength to more precisely determine the coverage holes.

Figure 10:
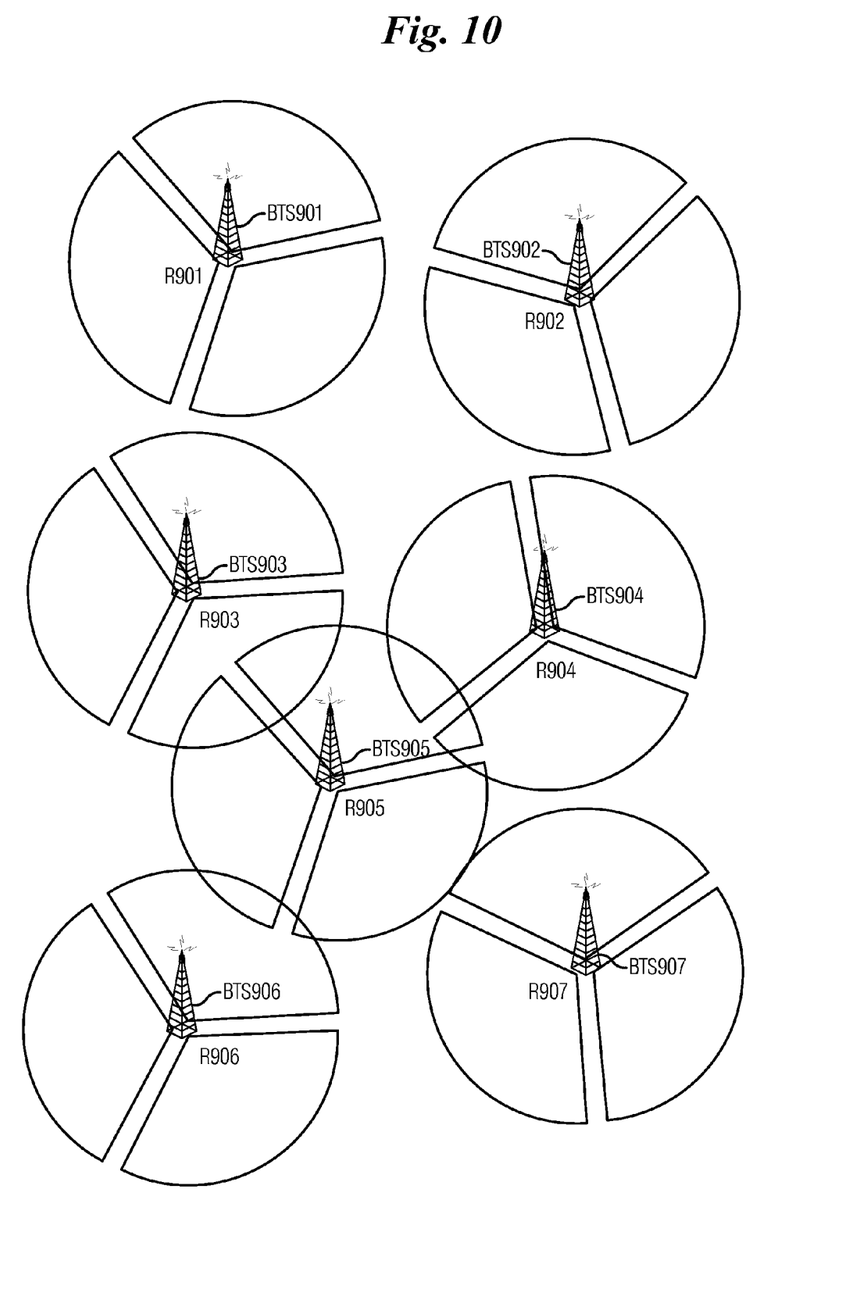
FIG. 10 is a network diagram illustrating a method of analyzing BTS-decommission decisions when merging multiple wireless networks in accordance with an embodiment of the present invention.

FIG. 10 is a network diagram that illustrates a BTS decommissioning strategy in accordance with an embodiment of the present invention. One example of a situation in which a BTS may need to be decommissioned is when wireless service providers merge. In many cases, wireless service providers may have overlapping network components. Thus, when wireless service providers merge, the merged network may contain redundant network elements. In these cases, it may be desirable to decommission some BTSs in the network to save operational costs and improve network performance (e.g., by reducing RF interference).

Generally, an embodiment of the present invention determines a BTS decommissioning strategy by determining a BTS Investment Return Value (R901-R907) for each BTS based on the revenue loss of decommissioning the BTS and cost of keeping the BTS. The method is described in greater detail below with reference to FIG. 11.

Figure 11:
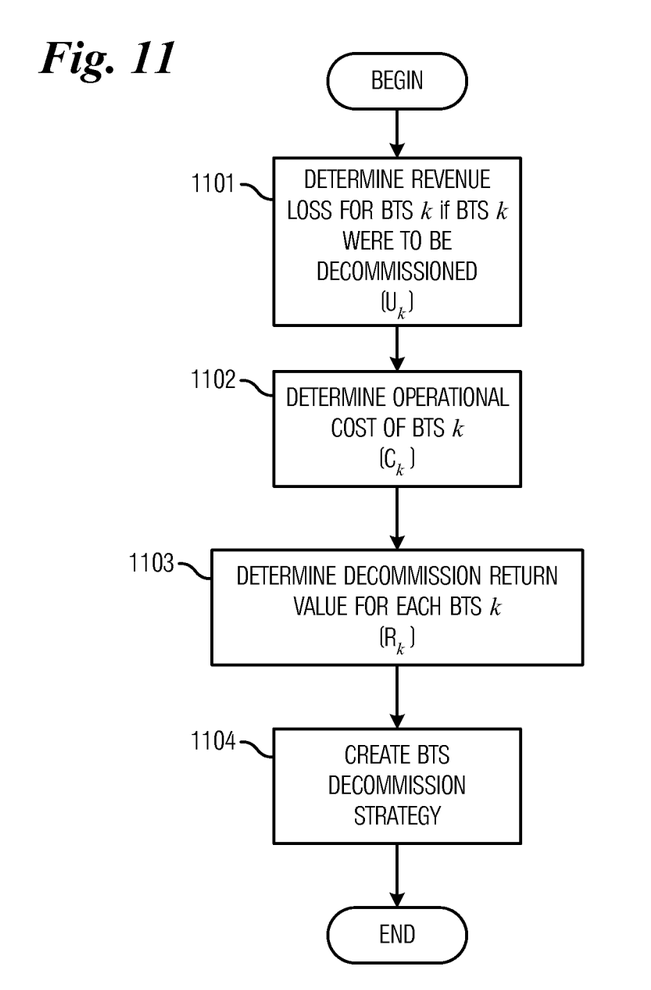
FIG. 11 is a flow diagram illustrating a method of analyzing BTS-decommission decisions when merging multiple wireless networks in accordance with an embodiment of the present invention.

FIG. 11 is a data flow diagram that illustrates a method for analyzing a BTS decommissioning strategy in accordance with an embodiment of the present invention. The process begins in step 1101, wherein the revenue loss $U_k$ from BTS k if BTS k were to be decommissioned is calculated. The revenues loss $U_k$ is preferably based upon the revenue data and CDR data at BTS k. The following equation may be used to determine the revenue loss $U_k$ if BTS k were to be decommissioned.

$$U_k = \sum_i \left[ V_i * \frac{MOU_{ik}}{\sum_j MOU_{ij}} \right]$$

wherein
k represents a BTS;
i represents a subscriber;
$V_i$ is the revenue per month for subscriber i (as determined at step 402 of FIG. 4);
$MOU_{ik}$ is the MOU of subscriber i at BTS k (as determined at step 602 of FIG. 6);
$MOU_{ij}$ is the minutes of use for subscriber i in sector j; and $$\sum_j MOU_{ij}$$

is the sum of the minutes of use for subscriber i in all sectors.

The calls that are expected to be processed by neighboring BTSs are calculated by the covering areas of the neighboring BTSs and the spare capacity at those BTSs. In step 1102, the cost $C_k$ of maintaining the BTS k is determined, preferably as the sum of the monthly equipment cost $E_k$, site monthly leasing cost $L_k$, and monthly transport leasing cost $T_k$. Other monthly costs $O_k$, such as electricity, may also be included. Next, in step 1103, a BTS decommissioning return value $R_k$ for BTS k is determined, preferably as the cost $C_k$ of maintaining BTS k less the revenue loss $U_k$ from BTS k if BTS k were to be decommissioned. A return value $R_k$ may be calculated for a plurality of BTSs. Thereafter, in step 1104, a BTS decommissioning strategy may be determined based at least in part by prioritizing the BTS decommissioning return values $R_k$ for each BTS k.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of determining a decommissioning strategy in a wireless network, the method comprising:
   determining, using a computer system, a revenue loss value for one or more base transceiver stations (BTSs) of a plurality of BTSs, the revenue loss value representing an amount of revenue that would be lost if that BTS were to be decommissioned;
   determining, using the computer system, an operational cost for each BTS, the operational cost representing an expected cost of operating that BTS if that BTS were not decommissioned;
   determining, using the computer system, a decommission return value for the one or more BTSs; and
   determining, using the computer system, a first BTS to decommission in accordance with the decommission return value for the one or more BTSs.

2. The method of claim 1, wherein the revenue loss value for the one of the BTSs is determined in accordance with, for each subscriber, a subscriber revenue per month, a ratio of subscriber minutes of use at the BTS, and a sum of subscriber minutes of use in all sectors.

3. The method of claim 1, wherein the determining the revenue loss value is performed in accordance with an equation:

$$U_k = \sum_i \left[ V_i * \frac{MOU_{ik}}{\sum_j MOU_{ij}} \right]$$

wherein
   k represents a BTS;
   i represents a subscriber;
   $V_i$ is a revenue per month for subscriber i;
   $MOU_{ik}$ is minutes of use for subscriber at BTS k;
   $MOU_{ij}$ is minutes of use for subscriber i in sector j;

$$\sum_j MOU_{ij}$$

is a sum of minutes of use for subscriber i in all sectors; and
   $U_k$ represents the revenue loss value.

4. The method of claim 1, wherein the determining the operational cost is performed at least in part by summing a monthly equipment cost, a site monthly leasing cost, and a monthly transport leasing cost.

5. The method of claim 4, wherein the determining the operational cost is performed at least in part by also summing a monthly electricity cost.

6. The method of claim 1, wherein the determining the decommissioning return value is performed at least in part by subtracting the revenue loss value from the operational cost.

7. The method of claim 1, wherein the determining the first BTS to decommission is performed at least in part by prioritizing the BTSs in order of the decommissioning return value.

8. The method of claim 1, wherein two or more of the plurality of BTSs have at least partially overlapping coverage areas.

9. The method of claim 1, further comprising decommissioning the first BTS.

10. A computer program product for determining a decommissioning strategy in a wireless network, the computer program product having a non-transitory medium with a computer program embodied thereon, the computer program product comprising:
    computer program code for determining a revenue loss value for a plurality of base transceiver stations (BTSs), the revenue loss value representing an amount of revenue that would be lost if that BTS were to be decommissioned;
    computer program code for determining an operational cost for one or more of the BTSs, the operational cost representing an expected cost of operating that BTS if that BTS were not decommissioned;
    computer program code for determining a decommissioning return value for each BTS; and
    computer program code for determining a first BTS to decommission in accordance with the decommission return value for the one or more BTSs.

11. The computer program product of claim 10, wherein the revenue loss value for the one of the BTSs is determined by the computer program code in accordance with, for each subscriber, a subscriber revenue per month, a ratio of subscriber minutes of use at the BTS, and a sum of subscriber minutes of use in all sectors.

12. The computer program product of claim 10, wherein the computer program code for determining the revenue loss value includes computer program code for performing an equation:

$$U_k = \sum_i \left[ V_i * \frac{MOU_{ik}}{\sum_j MOU_{ij}} \right]$$

wherein
   k represents a BTS;
   i represents a subscriber;
   $V_i$ is revenue per month for subscriber i;
   $MOU_{ik}$ is minutes of use for subscriber at BTS k;
   $MOU_{ij}$ is minutes of use for subscriber i in sector j;

$$\sum_j MOU_{ij}$$

is a sum of minutes of use for subscriber i in all sectors; and
$U_k$ represents the revenue loss value.

13. The computer program product of claim 10, wherein the computer program code for determining the operational cost includes computer program code for summing a monthly equipment cost, a site monthly leasing cost, and a monthly transport leasing cost.

14. The computer program product of claim 13, wherein the determining the operational cost is performed at least in part by also summing a monthly electricity cost.

15. The computer program product of claim 10, wherein the computer program code for determining the decommissioning return value includes computer program code for subtracting the revenue loss value from the operational cost.

16. The computer program product of claim 10, wherein the computer program code for determining the first BTS to decommission includes computer program code for prioritizing the BTSs in order of the decommissioning return value.

17. A method of determining a decommissioning strategy in a wireless network, the method comprising:
    determining, using a computer system, a revenue loss value for one or more base transceiver stations (BTSs) of a plurality of BTSs, the revenue loss value representing an amount of revenue that would be lost if that BTS were to be decommissioned, wherein the revenue loss value for the one of the BTSs is determined in accordance with, for each subscriber, a subscriber revenue per month, a ratio of subscriber minutes of use at the BTS, and a sum of subscriber minutes of use in all sectors;
    determining, using the computer system, an operational cost for each BTS, the operational cost representing an expected cost of operating that BTS if that BTS were not decommissioned, wherein the determining the operational cost is performed at least in part by summing a monthly equipment cost, a site monthly leasing cost, and a monthly transport leasing cost;
    determining, using the computer system, a decommission return value for the one or more BTSs, wherein the determining the decommissioning return value is performed at least in part by subtracting the revenue loss value from the operational cost; and
    determining, using the computer system, a first BTS to decommission in accordance with the decommission return value for the one or more BTSs, wherein the determining the first BTS to decommission is performed at least in part by prioritizing the BTSs in order of the decommissioning return value.

18. The method of claim 17, wherein the determining the revenue loss value is performed in accordance with an equation:

$$U_k = \sum_i \left[ V_i * \frac{MOU_{ik}}{\sum_j MOU_{ij}} \right]$$

wherein
    k represents a BTS;
    i represents a subscriber;
    $V_i$ is a revenue per month for subscriber i;
    $MOU_{ik}$ is minutes of use for subscriber at BTS k;
    $MOU_{ij}$ is minutes of use for subscriber i in sector j;
    $\sum_j MOU_{ij}$ is a sum of minutes of use for subscriber i in all sectors; and
    $U_k$ represents the revenue loss value.

19. A computer program product for determining a decommissioning strategy in a wireless network, the computer program product having a non-transitory medium with a computer program embodied thereon, the computer program product comprising:
    computer program code for determining a revenue loss value for a plurality of base transceiver stations (BTSs), the revenue loss value representing an amount of revenue that would be lost if that BTS were to be decommissioned, wherein the revenue loss value for the one of the BTSs is determined by the computer program code in accordance with, for each subscriber, a subscriber revenue per month, a ratio of subscriber minutes of use at the BTS, and a sum of subscriber minutes of use in all sectors;
    computer program code for determining an operational cost for one or more of the BTSs, the operational cost representing an expected cost of operating that BTS if that BTS were not decommissioned, wherein the computer program code for determining the operational cost includes computer program code for summing a monthly equipment cost, a site monthly leasing cost, and a monthly transport leasing cost;
    computer program code for determining a decommissioning return value for each BTS, wherein the computer program code for determining the decommissioning return value includes computer program code for subtracting the revenue loss value from the operational cost; and
    computer program code for determining a first BTS to decommission in accordance with the decommission return value for the one or more BTSs, wherein the computer program code for determining the first BTS to decommission includes computer program code for prioritizing the BTSs in order of the decommissioning return value.

20. The computer program product of claim 19, wherein the computer program code for determining the revenue loss value includes computer program code for performing an equation:

$$U_k = \sum_i \left[ V_i * \frac{MOU_{ik}}{\sum_j MOU_{ij}} \right]$$

wherein
    k represents a BTS;
    i represents a subscriber;
    $V_i$ is revenue per month for subscriber i;
    $MOU_{ik}$ is minutes of use for subscriber at BTS k;
    $MOU_{ij}$ is minutes of use for subscriber i in sector j;
    $\sum_j MOU_{ij}$ is a sum of minutes of use for subscriber i in all sectors; and
    $U_k$ represents the revenue loss value.

* * * * *

UNITED STATES PATENT AND TRADEMARK OFFICE
CERTIFICATE OF CORRECTION

PATENT NO. : 8,645,251 B2
APPLICATION NO. : 13/856239
DATED : February 4, 2014
INVENTOR(S) : Will A. Egner

It is certified that error appears in the above-identified patent and that said Letters Patent is hereby corrected as shown below:

In the Claims

In Col. 10, lines 2-3, claim 3, delete " $\sum_j MOU_{ij}$ " and insert -- $\sum_j MOU_{ij}$ --.

In Col. 11, lines 1-2, claim 12, delete " $\sum_j MOU_{ij}$ " and insert -- $\sum_j MOU_{ij}$ --.

Signed and Sealed this
Fifteenth Day of April, 2014

Michelle K. Lee
*Deputy Director of the United States Patent and Trademark Office*